No. 818,406. PATENTED APR. 24, 1906.
A. W. BARTLETT.
MECHANICAL MOTOR AND BRAKE.
APPLICATION FILED MAY 31, 1905.

Witnesses:
By his Attorney
Edward N. Pagelsen.

Inventor
A. W. Bartlett.

UNITED STATES PATENT OFFICE.

ARTHUR W. BARTLETT, OF MONTEAGLE VALLEY, CANADA.

MECHANICAL MOTOR AND BRAKE.

No. 818,406.  Specification of Letters Patent.  Patented April 24, 1906.

Application filed May 31, 1905. Serial No. 263,206.

*To all whom it may concern:*

Be it known that I, ARTHUR W. BARTLETT, a subject of the King of Great Britain and Ireland, and a resident of Monteagle Valley, in the county of Hastings, Province of Ontario, and Dominion of Canada, have invented a new and useful Mechanical Motor and Brake for Bicycles, of which the following is a specification.

My invention relates to attachments for bicycles and other manually-operated vehicles, by means of which energy may be stored during the time such energy is usually wanted, which energy may be afterward used for the propulsion of the vehicle; and the embodiment of my invention consists in a long flat spring, that is adapted to be wound up when the momentum of the vehicle is to be overcome and when the vehicle is descending hills or other inclines.

A further object of my invention is to adapt this mechanism to the propulsion of the vehicle by means of the stored energy.

I attain the objects of my invention by the construction illustrated in the accompanying drawings, in which—

Figure 1:
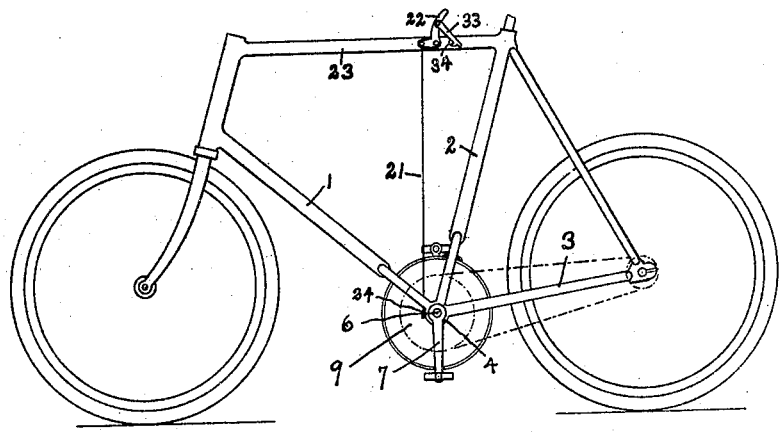
Figures 2, 3, 4:
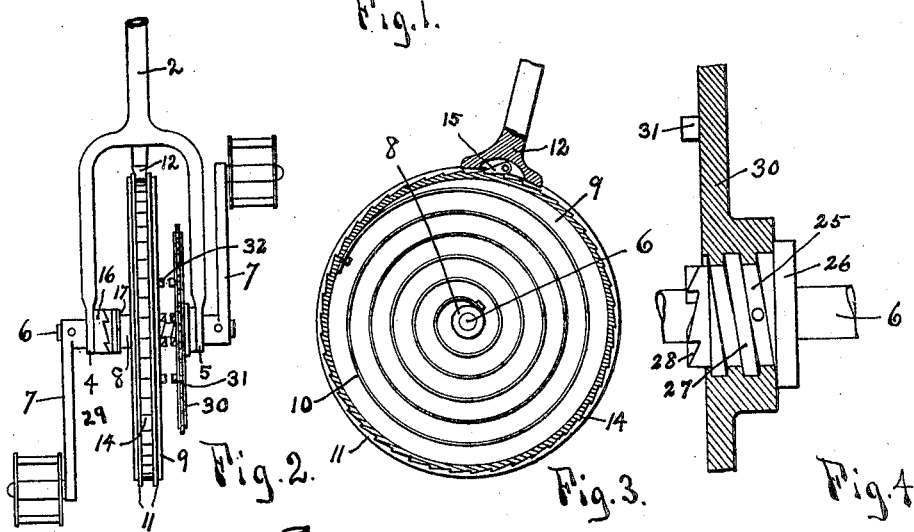
Figure 5:
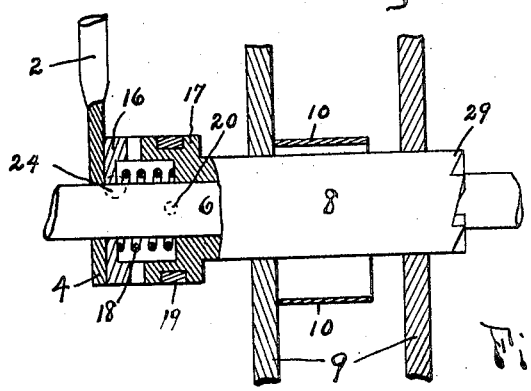

Figure 1 is a side view of a portion of a bicycle with my improved mechanism mounted thereon. Fig. 2 is a rear view of my improved device. Fig. 3 is a longitudinal vertical cross-section of the same. Figs. 4 and 5 are enlarged details of the same.

Similar reference characters refer to like parts throughout the several views.

In the bicycle illustrated in Fig. 1 the wheels are mounted in the usual manner in the frame, which frame is of the usual construction with the exception of a few slight variations at the crank-hanger. The diagonal tubes from the front and the seat-post, respectively, are forked at the crank-hanger. The sprocket-wheel on the rear axle is of the usual construction, and the chain may be of any desired type.

The tubes 1 and 2, as stated, are forked and unite with the front ends of the rear rods 3 at the plates 4 and 5 of the crank-hangers. The shaft 6 is revoluble in these plates and carries on its ends the pedal-cranks 7. A sleeve 8 is loosely mounted on this shaft, and on the sleeve is loosely mounted the hollow drum 9. The sleeve and drum are flexibly connected by the mainspring 10, the sleeve being slidable endwise in the drum to a limited extent. Two beads 11 on the drum engage the sides of the downwardly-extending fork 12, which is secured to the lower part of the post 2, preferably in its fork. In the bottom of the groove between these beads are the teeth 14, which are engaged by the pawl 15, mounted in the lower face of the fork 12. By these means the drum is prevented from sliding endwise with reference to the shaft and from turning backward.

Secured to the plate 4 is a half-jaw clutch 16, the teeth of which are adapted to fit the teeth formed on the enlarged portion 17 of the sleeve 8. The half-clutch 16 and the end 17 of the sleeve 8 are counterbored to receive the spring 18, which tends to force the teeth apart. The part 17 of the sleeve is provided with a groove in which is slidable a ring, which ring 19 has a projecting pin 20, to which attaches the shifter 21, which may be a flexible band, a cable, or other desirable means. The other end of the shifter attaches to the lever 22 on the cross-bar 23. The shifter passes around the roller 24, mounted on the part 16, as shown in dotted lines in Fig. 5. Thus by operating the lever 22 the sleeve 8 may be locked to the frame of the bicycle, and on releasing the lever the sleeve is disengaged therefrom by the action of the spring 18.

Pinned to the shaft 6 is a short sleeve 25, which is provided with a collar 26, a screw-thread 27, and jaw-clutch teeth 28. These teeth are adapted to engage the teeth 29 on the right end of the sleeve 8 when the sleeve is moved to the right by the spring 18. On the sleeve 25 is mounted the main sprocket-wheel 30, which has projecting lugs 31, which are adapted to engage the lugs 32 on the side of the drum 9.

The operation of the mechanism is as follows: Under ordinary conditions the sleeve 8 is over to the left under pull of the shifter, the sprocket is screwed upon the sleeve 25 until it contacts with the shoulder 26, and the bicycle is thus driven by the pedals in the usual manner. When coming down a hill or when it is desired to decrease the speed of the vehicle suddenly, the rider stops his pedals, and with them the sleeve 25. The vehicle continues to move, the sprocket-chain driving the sprocket-wheel 30 forward, thus causing it to travel to the left on account of its being mounted on the thread 27. A slight amount of revolution with respect to the sleeve 25 will cause the lugs 31 on the wheel to engage the lugs 32 on the drum, thus causing the drum to revolve with the sprocket-wheel and wind up the spring. As the spring increases its resistance as it becomes wound the vehicle will also decrease in speed. When it is desired to disengage the sprocket from the drum, the pedals are forced forward faster than they are carried by the sprocket, thus screwing the thread on the sleeve 25 into the hub of the sprocket-wheel and pulling the lugs 31 out of engagement with the lugs 32. The spring will then remain wound up, because the pawl 15 prevents the drum from turning backward, and the sleeve 8 is prevented from turning forward by being in engagement with the clutch part 16. Whenever a bad piece of road or a hill is met, the lever 22 is released, permitting the spring 18 to disengage the sleeve 8 from the clutch part 16 and to force the sleeve over far enough to engage the teeth 29 on the same into engagement with the teeth 28 on the short sleeve 25, that is fastened to the crank-shaft. The spring will then tend to revolve the sleeve 8 and with it the crank-shaft forward, materially assisting the rider in climbing the hill. The excess of energy in going down a hill is thus stored to assist the rider to go up the next hill.

The lever may be held in position by any desired device, such as the hook 33, that may engage the pin 34, projecting from the cross-bar 23.

Having now explained my improvement, what I claim as my invention, and desire to secure by Letters Patent, is—

1. In a mechanical motor for bicycles, the combination of a shaft, a sleeve mounted thereon, a drum mounted on the sleeve, a spring forming a resilient connection between the two, means to drive said drum, means to lock said sleeve, and means to release said sleeve and permit the same to be driven by said drum.

2. In a mechanical motor for bicycles, the combination of a pedal-shaft, a sleeve loosely mounted thereon, a drum loosely mounted on said sleeve, a spring connecting said sleeve and drum, a sprocket-wheel secured to said shaft, said wheel adapted to be positioned to drive said drum, means to lock said sleeve, and means to move said sleeve into driving engagement with said shaft so said sleeve and shaft may be driven by said spring.

3. In a mechanical motor for bicycles, the combination of a shaft, sleeve mounted thereon, a drum mounted on said sleeve, means to prevent the backward rotation of the drum, a spring within the drum to form a connection between the sleeve and drum, a sprocket-wheel on said shaft and adapted to move into driving engagement with said drum, means to cause the sleeve to be held from rotation, and a spring to release said sleeve and to force it into driving relation with said shaft to permit the spring in said drum to drive said sleeve and shaft.

In testimony whereof I have signed my name to this specification in the presence of two subscribing witnesses.

ARTHUR W. BARTLETT.

Witnesses:
  JOHN SPENCE,
  ROBERT BUCHANAN.